United States Patent
Strothmann et al.

(10) Patent No.: US 8,091,106 B1
(45) Date of Patent: Jan. 3, 2012

(54) METHOD AND APPARATUS FOR USING DVD SUBPICTURE INFORMATION IN A TELEVISION RECEIVER

(75) Inventors: James Alan Strothmann, Zionsville, IN (US); Steven Anthony Barron, Fishers, IN (US); David Emery Virag, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 2758 days.

(21) Appl. No.: 09/603,339

(22) Filed: Jun. 26, 2000

(51) Int. Cl.
*H04N 7/173* (2011.01)
(52) U.S. Cl. .............................. 725/48; 725/49; 709/219
(58) Field of Classification Search ............. 725/37–61, 725/131, 139, 151; 709/217–231
See application file for complete search history.

(56) References Cited

U.S. PATENT DOCUMENTS

| | | | | |
|---|---|---|---|---|
| 5,875,303 A * | 2/1999 | Huizer et al. | ................. | 709/231 |
| 5,929,849 A * | 7/1999 | Kikinis | .................. | 725/113 |
| 5,987,509 A * | 11/1999 | Portuesi | .................. | 725/113 |
| 6,012,112 A * | 1/2000 | Brase et al. | ..................... | 710/62 |
| 6,064,385 A * | 5/2000 | Sturgeon et al. | ............. | 345/841 |
| 6,167,061 A * | 12/2000 | Nakatsugawa | ................ | 370/480 |
| 6,185,365 B1 * | 2/2001 | Murase et al. | .................. | 386/95 |
| 6,211,800 B1 * | 4/2001 | Yanagihara et al. | ............. | 341/50 |
| 6,219,839 B1 * | 4/2001 | Sampsell | ........................ | 725/40 |
| 6,230,295 B1 * | 5/2001 | Watkins | ........................ | 714/742 |
| 6,285,823 B1 * | 9/2001 | Saeki et al. | ..................... | 386/95 |
| 6,324,694 B1 * | 11/2001 | Watts et al. | ..................... | 725/32 |
| 6,344,836 B1 * | 2/2002 | Suzuki | .......................... | 345/2.1 |
| 6,370,323 B1 * | 4/2002 | Adolph et al. | ................. | 386/104 |
| 6,378,132 B1 * | 4/2002 | Grandin et al. | ................ | 725/146 |
| 6,392,695 B1 * | 5/2002 | Watamoto et al. | ............. | 348/173 |
| 6,393,202 B1 * | 5/2002 | Yamauchi et al. | ............. | 386/95 |
| 6,469,718 B1 * | 10/2002 | Setogawa et al. | ............. | 715/810 |
| 6,499,057 B1 * | 12/2002 | Portuesi | ......................... | 709/217 |
| 6,507,696 B1 * | 1/2003 | Chung et al. | ................... | 386/125 |
| 6,523,081 B1 * | 2/2003 | Karlsson et al. | .............. | 710/305 |
| 6,526,580 B2 * | 2/2003 | Shimomura et al. | ............ | 725/63 |
| 6,560,404 B1 * | 5/2003 | Okada et al. | ..................... | 386/95 |
| 6,564,255 B1 * | 5/2003 | Mobini et al. | .................. | 709/219 |
| 6,580,870 B1 * | 6/2003 | Kanazawa et al. | .............. | 386/95 |
| 6,678,006 B1 * | 1/2004 | Velez et al. | .................... | 348/564 |
| 6,678,008 B1 * | 1/2004 | Winter | .......................... | 348/565 |

(Continued)

FOREIGN PATENT DOCUMENTS

EP 0833514 A2 4/1998

(Continued)

OTHER PUBLICATIONS

International Search Report citing the above-listed references AK, AL, AM, AN, AO, AP, and AQ.

*Primary Examiner* — Annan Shang
(74) *Attorney, Agent, or Firm* — Robert D. Shedd; Joseph J. Opalach; Kuniyuki Akiyama (57) ABSTRACT

A method and apparatus for using DVD subpicture formatted information within a MPEG data stream to provide data channel information to a television receiver. More particularly, the television receiver comprises a MPEG decoder and a DVD subpicture processor. The MPEG decoder decodes the MPEG stream and extracts the DVD subpicture formatted signal and the DVD subpicture decoder processes one or more DVD subpicture bitstreams to produce DVD graphics. The DVD subpicture bitstream is used to carry and display data channel information such as stock quotes, electronic program guide information, advertisement information, and the like as well as provide interactive menuing functions.

16 Claims, 4 Drawing Sheets

U.S. PATENT DOCUMENTS

| | | | |
|---|---|---|---|
| 6,724,981 B1 * | 4/2004 | Park et al. | 386/125 |
| 6,751,401 B1 * | 6/2004 | Arai et al. | 386/83 |
| 6,847,365 B1 * | 1/2005 | Miller et al. | 345/502 |
| 6,912,350 B1 * | 6/2005 | Vasquez | 386/95 |
| 6,928,468 B2 * | 8/2005 | Leermakers | 709/221 |
| 7,068,920 B1 * | 6/2006 | Stahl | 386/230 |
| 2002/0056087 A1 * | 5/2002 | Berezowski et al. | 725/9 |
| 2004/0226042 A1 * | 11/2004 | Ellis | 725/43 |

FOREIGN PATENT DOCUMENTS

| | | |
|---|---|---|
| EP | 0866276 A2 | 12/1998 |
| EP | 0921682 A2 | 6/1999 |
| EP | 0961504 A2 | 12/1999 |
| WO | WO 97/41690 | 11/1997 |
| WO | WO 99/20049 | 4/1999 |
| WO | WO 99/29104 | 6/1999 |

* cited by examiner

METHOD AND APPARATUS FOR USING DVD SUBPICTURE INFORMATION IN A TELEVISION RECEIVER

BACKGROUND OF THE DISCLOSURE

1. Field of the Invention

The present invention relates to an apparatus and method for processing video signals, and more specifically, to an apparatus and a method for processing digital video disk (DVD) subpicture formatted information within a television signal.

2. Description of the Background Art

Most digital satellite, digital cable television set top boxes and digital over-the-air television receivers decode moving pictures experts group (MPEG)-compliant signals, ISO/IEC International Standards 11172 (1991) (generally referred to as MPEG-1) and 13818 (1995) (generally referred to as MPEG-2), to recover audio and video information therefrom. These signals comprise encoded bitstreams containing coded representations of a plurality of images, and audio and control information associated with the images. The bitstreams are generated by an encoder system and transmitted to a decoding system through a communications channel.

In addition to audio and video information, an MPEG-compliant signal is capable of carrying data services on a data service channel such that the receiver can display stock prices, weather information, sports scores, electronic program guide information, top news stories and the like. This data channel information is presented using the on-screen display (OSD) functions of the MPEG decoder.

However, the OSD functionality of an MPEG decoder has a very limited capability to display graphics. The data service channel is generally limited to the display of text information that scrolls along the bottom of a video image. As such, non-text information such as complex graphics or animation generally cannot be decoded and displayed using the OSD functions of the MPEG decoder. Also, MPEG-based graphics do not facilitate interactivity with a viewer.

Therefore, there is a need in the art for a method and apparatus for transmitting, decoding and displaying data channel information in a format that permits enhanced graphics functionality as compared to a graphics display system based on an MPEG decoder.

SUMMARY OF THE INVENTION

The invention provides a method and apparatus for using DVD subpicture formatted information within a MPEG data stream to provide data channel information to a television receiver or other device that uses an MPEG and DVD transport mechanism. One or more DVD subpicture bitstreams are combined with the MPEG bitstream and transmitted by a transmitter, and are processed by a DVD subpicture decoder in the receiving system.

An aspect of the invention provides a receiver (including television receivers, Institute of Electrical and Electronic Engineers (IEEE) standard 1394 digital interface or Universal Serial Bus (USB) digital interface) having a MPEG decoder and a DVD subpicture processor (also referred to as a DVD subpicture decoder). A transport unit parses and routes the MPEG data packets to a MPEG decoder and the DVD subpicture packets to a DVD subpicture decoder. The MPEG decoder generates a signal associated with the video program and the DVD subpicture decoder generates a signal associated with a graphics display that can be overlayed on the video program.

The DVD subpicture bitstream may be used to transmit and display data channel information such as stock quotes, electronic program guide information, advertisement information, and the like. The DVD subpicture information is also capable of supporting interactive functions. DVD subpicture information is designed to allow a user to interact with a DVD disk and select from a menu any locations or scene on a disk through sector addressing. In the DVD subpicture transmission application, the menu functionality is used to select different portions of the data channel DVD subpicture bitstream for display or to cause the receiver to select another stream of video in an interactive manner.

BRIEF DESCRIPTION OF THE DRAWINGS

The present invention is described with reference to the accompanying drawings, wherein.

To facilitate understanding, common reference numerals have been used to designate elements that are common to the figures.

DETAILED DESCRIPTION

Figure 1:
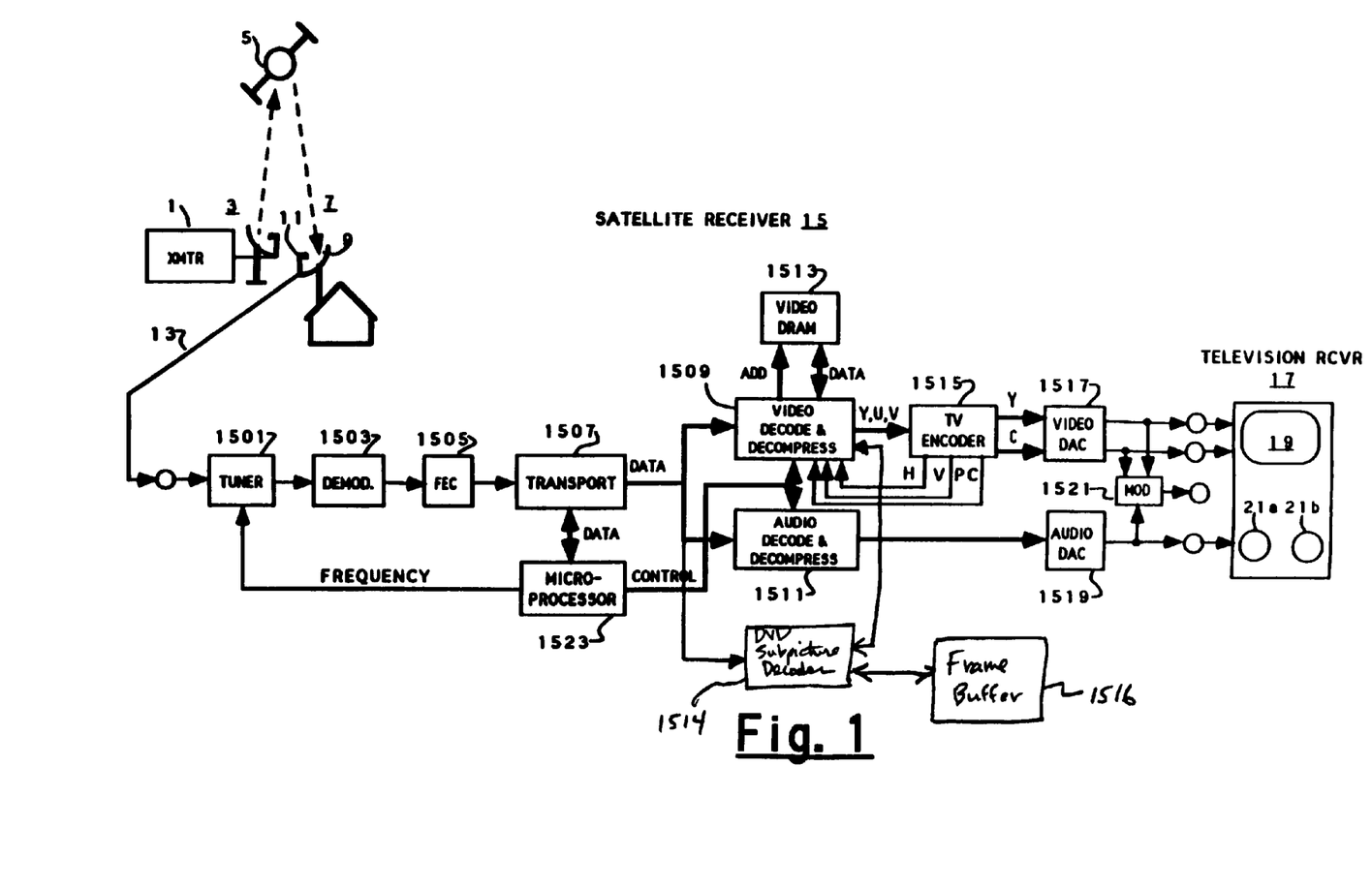
FIG. 1 depicts a block diagram of a digital video receiver system.

FIG. 1 illustrates a digital satellite receiver system suitable for receiving and decoding a bitstream comprising MPEG and DVD subpicture bitstreams in accordance with the present invention. The satellite television system shown in FIG. 1 is a digital television system in which television information is transmitted in compressed form in accordance with a predetermined digital compression standard such as MPEG-2. It is to be understood that the present invention may be implemented in any video signal processing system capable of receiving and decoding digital video signals for display, including those that receive the signals off the air or via cable systems.

Figure 2:
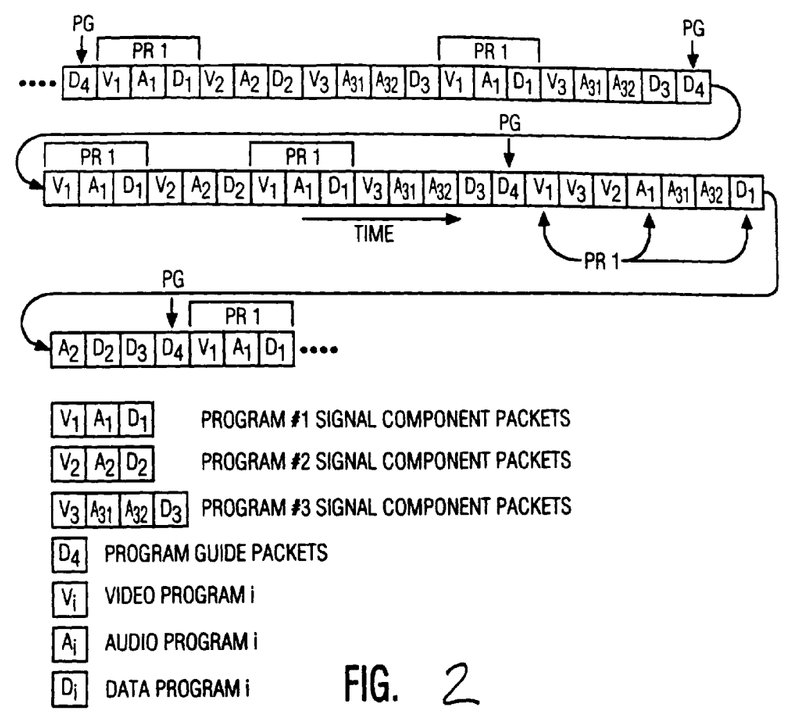
FIG. 2 depicts a string of packets corresponding to a plurality of programs and their associated video, audio and data packets.

A representation of a typical data stream processed by receiver system 15 is illustrated in FIG. 2. As shown in FIG. 2, the data stream includes a string of data packets that represent a plurality of video programs. The data packets are encoded, multiplexed and transmitted from transmitter 1. Packets with letters having like subscripts represent components of a single television program. For example, the packets identified as V1, A1 and D1 represent video, audio and data for program 1. In the upper line of the string of packets, the respective components of a particular program are shown grouped together. However, it is not necessary to group components of a particular program together, as indicated by the packet sequence in the middle of the string. Moreover, there is no requirement to place the packets of string in any particular order.

Each of the packets includes a header portion, which includes the program identifier (PID) and various control information, and a payload portion, which contains the actual information to be processed and displayed. In the present invention, the string includes data packets that include DVD subpicture information in the payload portion. The packets having DVD subpicture information are identified and associated with a particular program using respective PIDs.

The analog video and audio signals are converted to respective digital signals and encoded within transmitter 1. Also, forward error correction (FEC) data is added to the packets in order make the correction of errors due to noise within the transmission path possible. The well known Viterbi and Reed-Solomon types of forward error correction coding may both be advantageously employed. The digital information resulting from the compression, encoding and error correction operations is modulated on a carrier in what is known in the digital transmission field as QPSK (Quaternary Phase Shift Keying) modulation.

In the system shown in FIG. 1, transmitter 1, with associated transmitting antenna 3, transmits television signals including video and audio components to satellite 5 in geosynchronous earth orbit. Satellite 5 receives the television signals transmitted by transmitter 1 and retransmits them toward the earth. The television signals transmitted by satellite 5 are received by antenna assembly or "outdoor unit" 7. Antenna assembly 7 includes antenna 9 and a frequency converter 11. Antenna 9 directs the television signals transmitted from satellite 5 to frequency converter 11, which converts the frequencies of all the received television signals to respective lower frequencies.

The television signals produced by frequency converter 11 are coupled via coaxial cable 13 to satellite receiver 15. Satellite receiver 15 tunes, demodulates and otherwise processes the received television signal to produce video and audio signals in a format (NTSC, PAL or SECAM) suitable for processing by conventional television receiver 17 to which they are coupled. Television receiver 17 produces an image on display screen 19 in response to the video signals and an audible response by means of speakers 21*a* and 21*b* in response to the audio signals.

Satellite receiver 15 includes a tuner 1501 with a local oscillator and mixer (not shown) for selecting the appropriate carrier signal from the plurality of signals received from antenna assembly 7 and for converting the frequency of the selected carrier to a lower frequency to produce an intermediate frequency (IF) signal. The IF signal is demodulated by a QPSK demodulator 1503 to produce a demodulated digital signal. FEC decoder 1505 decodes the error correction data contained in the demodulated digital signal, and based on the error correction data corrects the demodulated packets representing video, audio and other information. For example, FEC decoder 1505 may operate according to Viterbi and Reed-Solomon error correction algorithms when Viterbi and Reed-Solomon error correction encoding is employed in transmitter 1. Tuner 1501, QPSK demodulator 1503 and FEC decoder 1505 may be included in a unit available from Hughes Network Systems of Germantown, Md. or from Comstream Corp., San Diego, Calif.

Transport unit 1507 is a demultiplexer which routes the video packets of the error corrected signal to a video decoder 1509, DVD subpicture data packets to DVD subpicture decoder 1514 and the audio packets to an audio decoder 1511 via a data bus according to the header information contained in the packets. Video decoder 1509 cooperates with a random access memory (RAM) 1513 for example, in the form of a dynamic RAM (DRAM), to decode and decompress the video packets in accordance with MPEG-2 to form a stream or sequence of digital words representing respective luminance (Y) and color difference (U and V) components. Video decoder 1509 may be incorporated in a single integrated circuit (IC). Suitable video decoding and decompression ICs are commercially available and well known to those skilled in the art. For example, a MPEG decoding and decompression IC, identified by part number ST3240, is available from SGS Thomson, of France.

The sequence of video component representative digital words is coupled to a television encoder 1515 which converts the component representative digital words to a sequence of digital words representing luminance (Y) information and a sequence of digital words representing chrominance (C) information in accordance with the line and field raster scanning format of a conventional television standard such a NTSC, PAL or SECAM. Television signal encoder 1515 generates line (H) and field (V) rate signals and a picture element (pixel) clock signal (P) which are coupled to video decoder 1509 to synchronize the component representative sequence of digital words. The luminance and chrominance representative digital words are converted to analog luminance and chrominance signals by respective sections of a digital-to-analog converter (DAC) 1517.

Audio decoder 1511 decodes and decompresses the audio packets and the resultant digital audio signal is converted to a baseband analog audio signal by a DAC 1519. Although only a single audio channel is indicated in FIG. 1, it will be appreciated that in practice one or more additional audio channels, for example, for stereophonic reproduction, may be provided as is indicated by speakers 21*a* and 21*b*.

The baseband analog video and audio signals are coupled to television receiver 17 via respective baseband connections. The baseband analog video and audio signals are also coupled to a modulator 1521 which modulates the analog signals on to a radio frequency (RF) carrier in accordance with a conventional television standard such as NTSC, PAL or SECAM for coupling to the antenna input of a television receiver without baseband inputs.

Microprocessor 1523 performs various control functions, including, but not limited to, providing frequency selection control data to tuner 1501 for controlling the operation of tuner 1501 to tune channels selected by the user, providing control data to video decoder 1509, DVD subpicture decoder 1514 and audio decoder 1511, and managing access to memory and controlling the display of the decoded images. Although the present invention describes a single microprocessor, those skilled in the art will realize that microprocessor 1523 may comprise various dedicated devices to manage specific functions, e.g., a memory controller, a microprocessor interface unit, and the like.

Microprocessor 1523 may generate, in the conventionally known manner, using graphics information included in the MPEG bitstream, control data for causing graphics images, such as alphanumeric characters and/or pictorial graphics, for example, representing status information and operating instructions, to be displayed on screen 19 of television receiver 17. The graphics data specifies the color and position of each picture element (pixel) of the graphics that are to be displayed. The graphics data represents a pixel by pixel map or "bit map" of the graphic image.

Advantageously, an on screen display (OSD) arrangement is integrally incorporated in video decoder 1509 and associated video RAM 1513, which are primarily used for the decoding and decompression of the video data packets. The graphics data is coupled to video decoder 1509 via the control bus. As a result of the shared use of video decoder 1509 and associated video RAM 1513, a separate OSD arrangement is not needed.

The OSD portion of video decoder 1509 includes an OSD controller that cooperates with an OSD section of video RAM 1513. The graphics representative bit map generated by microprocessor 1523 is coupled to the OSD section of RAM

1513 for storage. For each pixel of the graphic image there is a digital word representing a color for that pixel. The number of bits contained in the color representative digital words determines how many different colors each pixel can have. The OSD display unit in video decoder 1509 causes the bit map to be read out from the OSD section of RAM 1513, and converts the color representative word for each pixel to the corresponding component representative group from the header.

Typically, when the OSD function is enabled for a particular image or frame, microprocessor 1523 manipulates the data in memory 1513 to construct an OSD bitstream containing a header and data defining the OSD pixels. However, those skilled in the art will realize that the order of constructing and retrieving the OSD bitstream can be modified in a number of ways. For example, the OSD header can be read from the memory as microprocessor 1523 is formatting the OSD data, or the OSD data can be processed and displayed as OSD messages by a separate OSD unit without having to retrieve the entire OSD bitstream.

Conventionally, the video and OSD are displayed in one of at least three different modes. In a video image only mode of operation, an output multiplexer (not shown) of video decoder 1509 selects only the video image groups. In a graphic image only mode of operation, the output multiplexer selects only the graphic image groups. In a "superimpose" mode of operation, in which the graphic image is inserted within a video image, the output multiplexer selects either the video image groups or the graphic image groups on a pixel by pixel basis.

According to the present invention, receiver 15 can also provide graphics images based on DVD subpicture data packets included with the MPEG bitstream. The DVD subpicture information is inserted into the MPEG bitstream at transmitter 1 by using a predetermined picture identification (PID) for the DVD subpicture information. The DVD subpicture bitstream comprises run length encoded bit maps that are compressed in accordance with the run-length compression rules specified in the DVD specification part 3. The bit maps can be overlayed atop the MPEG reconstructed video. The DVD subpicture information can comprise up to 32 subpicture bitstreams. The DVD subpicture bitstream is decoded by DVD subpicture decoder 1514 to generate a signal that corresponds to a graphics image, which image is coupled to video decoder 1509. Video decoder 1509 combines the DVD subpicture graphics signal with the MPEG video signal in one of a video only, graphics only or superimpose mode to generate the output display.

The user may select one program to display as an audio-video program while a data channel program is simultaneously processed and overlayed using DVD subpicture processor 1514. For example, a user may select a program to display while at the same time requesting that stock quotes be displayed on the bottom of the video display. The stock quotes are encoded as a DVD subpicture bitstream having a predetermined PID, and combined and transmitted with the video program bitstream. When the bitstream is received, video decoder 1509 decodes the program information for display, while the DVD subpicture bitstream is decoded by DVD subpicture processor 1514 for overlaying a graphic image onto the program display.

Applications for DVD subpicture formatted information include menu structures, subtitles, karaoke, and simple animation as well as MPEG still pictures. This information is formatted as part- or full-screen bitmaps having four pixel values. The pixels within a subpicture bitmap are divided into four types that include background, foreground, emphasis-1 and emphasis-2. The four pixel types are represented by two-bits. The subpicture information uses four colors out of a sixteen color palette and four contrast values out of sixteen available contrast values. The subpicture format enables the area, content, color and contrast of the subpicture region to be changed with every video field.

A subpicture display control sequence controls the presentation of each of the subpictures. The subpictures include presentation effects such as scrolling up and down, subpicture location changes, fading in and out, scrolling left and right, transparency changes and the like.

The subpicture formatted information is carried in a packet (also known as a "unit structure") having a subpicture header (SPUH), pixel data (PXD) and a display control sequence table (SP_DCSQT). The display control sequence table carries a plurality of display control sequences. Each display control sequence comprises a start time, a pointer to the next display control sequence, and a command sequence. A command sequence is a plurality of commands including set start address in the display picture, set colors, set contrast, set subpicture screen position, and set the start and stop display. As such, the subpicture display formatted information can be controlled to be displayed anywhere on the screen. Also as multiple subpicture bitstreams may be transmitted (up to 32), multiple displays can be included in the output display and the subpicture displays can also be layered to provide menuing capabilities.

Figure 3:
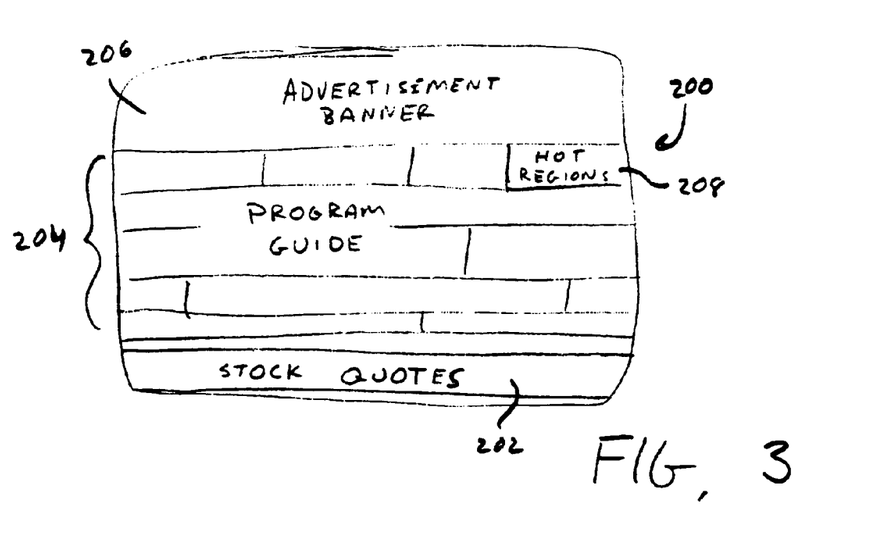
FIG. 3 depicts a television display showing information recovered from a DVD formatted subpicture information.
Figure 4:
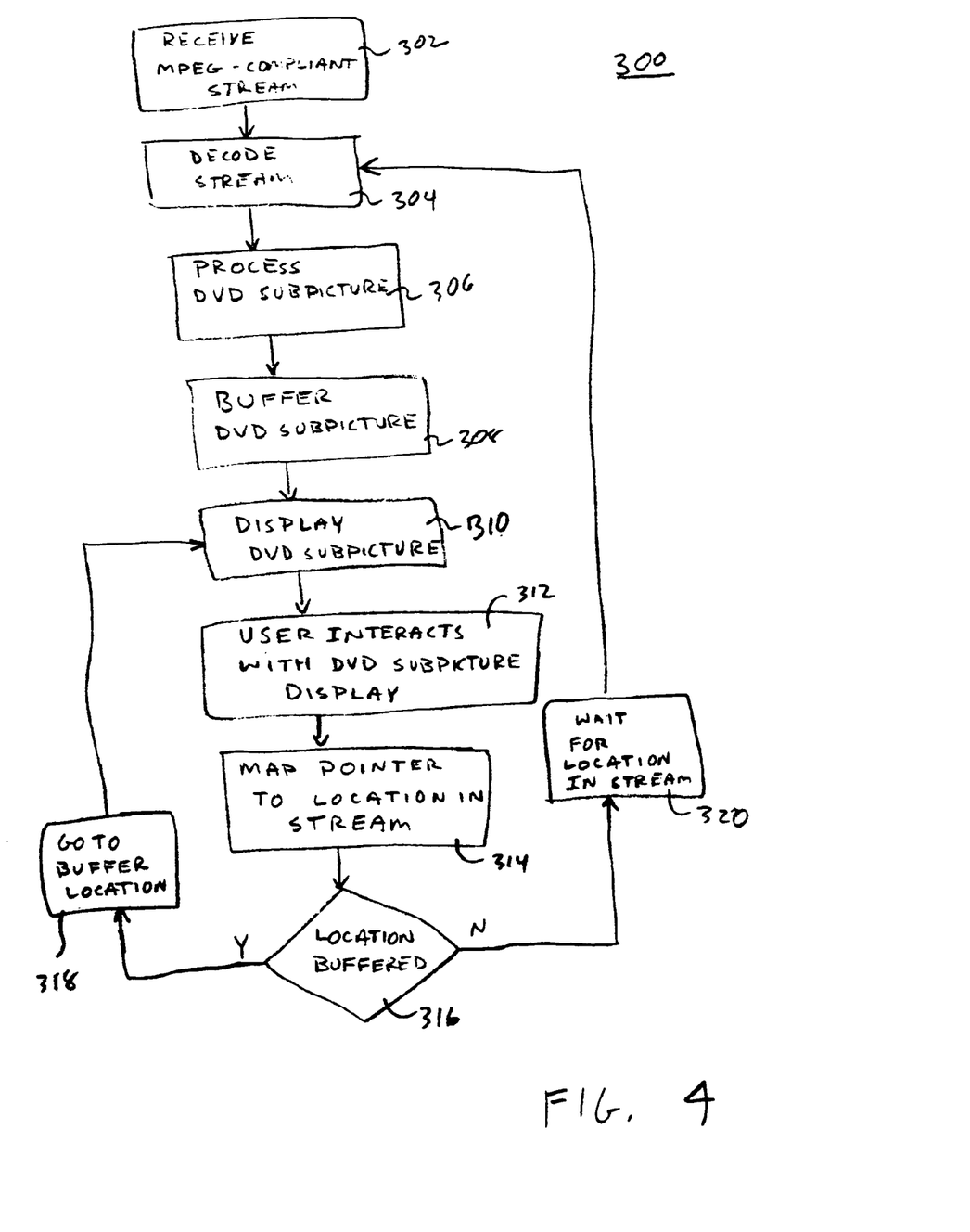
FIG. 4 depicts a flow diagram of a method of processing DVD subpicture information extracted from a MPEG data stream.

FIG. 3 is an exemplary display 200 of the use of DVD formatted information from a plurality of subpicture bitstreams. One DVD bitstream can be used for displaying stock quotes in a banner 202 along the bottom of the screen while another bitstream can be used for carrying an advertisement banner 206 comprising MPEG still information. One or more DVD subpicture formatted bitstreams can be used for carrying program guide information 204. The program guide information is interactive such that hot regions 208 are displayed using the highlighting function (emphasis-1 and/or emphasis-2) of the DVD subpicture format such that a user may "browse" a region in the program guide and have the subpicture processor highlight the region. Once the highlighted region is "selected" (i.e., depressing a select key on a remote control device while the region is highlighted), the receiver may either select another program guide page for display, select some other DVD subpicture information or map that region to a new channel to be tuned and displayed. As such, the user can select a channel for display directly from the program guide and have the tuner automatically tune to that channel.

For further functionality of the DVD formatted subpicture information, the entire DVD subpicture bitstream can be decoded and stored in frame buffer 1516 such that the user can interactively change to one of the other decoded and stored bitstreams or any location within a bitstream for display. As such, a fully interactive program guide or other data channel information can be supplied to the user. To limit the size of frame buffer 1516, portions of the DVD subpicture bitstreams are decoded and stored in frame buffer 1516 while the remainder can be demodulated and decoded as needed. To facilitate this decoding with a reasonable decoding latency, the DVD subpicture bitstreams repeat within the MPEG stream on a regular basis. The decoding process will be further described with respect to FIG. 3.

FIG. 3 depicts a flow diagram of the operation of the present invention. The method 300 begins at step 302 by receiving a MPEG compliant bitstream. The DVD subpicture bitstream is extracted and coupled to DVD subpicture decoder 1514 and decoded at step 304. At step 306, the DVD decoded subpicture information is processed starting with the base PID of the subpicture information. The subpicture information processing is only performed when either the user has selected data channel information to be displayed simultaneously with the MPEG video as an overlay or the user has tuned to a channel that contains only DVD subpicture information to form an interactive session. The processed DVD subpicture information is stored at step 308 in frame buffer 1514. Generally only the necessary DVD subpicture information is stored and other information will be decoded and stored as needed. At step 310, the processed DVD subpicture information is displayed.

At step 312, the user may interact with the DVD subpicture information by selecting a hot region within the display. A hot region is a highlighted region that can be "browsed" by manipulation of a remote control. In a conventional DVD, the selection of a hot region causes a mapping function to be invoked that connects the selection event with a sector location on the DVD. The imagery starting at the sector is then decoded and displayed. The present invention invokes an analogous process when a hot region is selected to identify a location either in frame buffer 1514 or in the MPEG stream for the beginning of a selected DVD subpicture bitstream. At step 314, a pointer is mapped to a location within the bitstream that corresponds to the DVD subpicture information that will represent the information for the selected hot region.

At step 316, method 300 queries whether that information is already buffered within frame buffer 1514. If the query at step 316 is affirmatively answered, method 300 proceeds to step 318 where the buffer location is found for the beginning of the bitstream corresponding to that hot region. Method 300 then proceeds to step 310 to display that DVD subpicture information. If the location is not buffered, method 300 proceeds from step 316 to step 320 to wait for the appropriate location within the DVD subpicture bitstream to be decoded and then method 300 returns to step 304 to decode the bitstream starting with the beginning of the portion that is selected. In this manner, the DVD subpicture information does not have to be completely buffered. As such, the interactive DVD menu structure can be used for navigating through a number of menus and also selecting programming for display to the user.

Although an embodiment that incorporates the teachings of the present invention has been shown and described, it is to be understood that those skilled in the art may devise varied embodiments that still incorporate these teachings. For example, although the various decoder units are illustrated to be separate units, it is to be understood that the decoders may be incorporated within a single integrated circuit. Therefore, it is to be understood that the present invention is intended to cover all modifications as would fall within the true scope and spirit of the present invention.

What is claimed is:

1. A method for providing graphics display, comprising the steps of:
    receiving a bitstream from a remote signal source including an MPEG compliant program bitstream and a DVD subpicture compliant bitstream, wherein a portion of the DVD subpicture compliant bitstream is repeated in said received bitstream;
    extracting and decoding the MPEG compliant program bitstream to generate a program image signal;
    extracting and decoding the DVD subpicture compliant bitstream to generate a graphic image signal; and
    combining the program image signal and the graphic image signal to provide an output display signal, wherein the DVD subpicture compliant bitstream comprises an interactive graphic having selectable regions that, when selected, causes the display of other DVD subpicture graphics associated with said subpicture compliant bitstream.

2. The method of claim 1, wherein the received bitstream comprises a plurality of DVD subpicture compliant bitstreams, and the plurality of DVD subpicture compliant bitstreams are extracted and decoded to generate a plurality of graphic image signals.

3. The method of claim 2, wherein at least one of the decoded DVD subpicture compliant bitstreams is buffered.

4. The method of claim 1, wherein the DVD subpicture compliant bitstream comprises an MPEG still image.

5. The method of claim 1, wherein the DVD subpicture compliant bitstream comprises an interactive program guide.

6. The method of claim 1, wherein the interactive graphic further comprises a selectable region that, when selected, causes the receiver to decode a particular MPEG compliant program bitstream.

7. A video signal processing apparatus, comprising:
    means for receiving a bitstream comprising an MPEG compliant program bitstream and a DVD subpicture compliant bitstream, wherein a portion of the DVD subpicture compliant bitstream is repeated in said received bitstream;
    means for parsing the received bitstream, and routing the MPEG compliant program bitstream to a MPEG decoder, and routing the DVD subpicture compliant bitstream to a DVD subpicture processor, the MPEG decoder generating a program image signal in response to the MPEG compliant program bitstream, the DVD subpicture processor generating a graphic image signal in response to the DVD subpicture compliant bitstream;
    means for combining the program image signal and the graphic image signal to provide an output image signal; and
    a display processor coupled to the combining means for displaying said output image, wherein the DVD subpicture compliant bitstream comprises an interactive graphic having selectable regions that, when selected, causes the display of other DVD subpicture graphics associated with said subpicture compliant bitstream.

8. The apparatus of claim 7, wherein the receiving means comprises a digital interface and a demodulator coupled to the digital interface and the MPEG decoder.

9. The apparatus of claim 8, wherein the digital interface is an IEEE 1394 digital interface.

10. The apparatus of claim 8, wherein said digital interface is a USB digital interface.

11. The apparatus of claim 7, further comprising a frame buffer coupled to the DVD subpicture processor.

12. The apparatus of claim 11, wherein the receiving means receives a bitstream comprising a plurality of DVD subpicture compliant bitstreams, and the DVD subpicture processor decodes the plurality of DVD subpicture compliant bitstreams to generate a plurality of graphic image signals.

13. The apparatus of claim 12, wherein at least one of the graphic image signals is buffered in the frame buffer.

14. The apparatus of claim 7, wherein the display processor is operable for generating an interactive program guide in response to the graphic image signal.

15. A method for providing graphics display comprising the steps of:
    receiving a bitstream from a remote signal source, said bitstream including an MPEG compliant program bitstream and a DVD subpicture compliant bitstream, wherein a portion of the DVD subpicture compliant bitstream is repeated in said received bitstream;

extracting and decoding the MPEG compliant program bitstream to generate a program image signal;

extracting and decoding the DVD subpicture compliant bitstream to generate a graphic image signal; and combining the program image signal and the graphic image signal to provide an output display signal, wherein the DVD subpicture compliant bitstream comprises interactive graphic having selectable regions that, when selected, causes the display of other DVD subpicture graphics associated with said subpicture compliant bitstream.

16. A method for providing graphics display as defined in claim 15, wherein said bitstream from a remote signal source further comprises at least two MPEG compliant program bitstreams transmitted substantially concurrently by said remote signal source.

* * * * *